(12) United States Patent
Cimini et al.

(10) Patent No.: US 7,260,581 B1
(45) Date of Patent: Aug. 21, 2007

(54) METHOD AND APPARATUS FOR ERROR PROOFING

(75) Inventors: Michael O. Cimini, Fairfield, OH (US); Jeffrey S. Keller, Cincinnati, OH (US); Gene E. Wiggs, West Chester, OH (US); Bethany B. Kniffin, Clifton Park, NY (US); Christopher R. Hammond, Schenectady, NY (US); Peder Fitch, Vancouver, WA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/495,268

(22) Filed: Jan. 31, 2000

(51) Int. Cl.
*G06F 17/00* (2006.01)

(52) U.S. Cl. .................... 707/102; 707/9; 707/101; 707/104.1

(58) Field of Classification Search ............. 707/1–10, 707/100–104.1, 200–205, 500, 500.1
See application file for complete search history.

(56) References Cited

U.S. PATENT DOCUMENTS

| | | | |
|---|---|---|---|
| 5,594,859 A * | 1/1997 | Palmer et al. ............ 707/500.1 |
| 5,781,191 A * | 7/1998 | Mayuzumi et al. ......... 715/705 |
| 5,793,966 A * | 8/1998 | Amstein et al. |
| 5,923,014 A | 7/1999 | Szymusiak et al. |
| 5,987,422 A * | 11/1999 | Buzsaki ...................... 707/100 |
| 5,987,454 A * | 11/1999 | Hobbs .......................... 707/4 |
| 6,014,658 A * | 1/2000 | Pretz ............................. 707/2 |
| 6,026,148 A * | 2/2000 | Dworkin et al. ......... 379/88.18 |
| 6,161,101 A | 12/2000 | Guinta et al. |
| 6,161,113 A * | 12/2000 | Mora et al. ................ 707/505 |
| 6,236,989 B1 * | 5/2001 | Mandyam et al. ............. 707/4 |
| 6,292,827 B1 * | 9/2001 | Raz ............................ 709/217 |
| 6,327,589 B1 * | 12/2001 | Blewett et al. ................ 707/5 |
| 6,584,466 B1 * | 6/2003 | Serbinis et al. ............. 707/10 |
| 2002/0055910 A1 * | 5/2002 | Durbin ........................ 705/64 |

* cited by examiner

*Primary Examiner*—Isaac Woo
(74) *Attorney, Agent, or Firm*—William Scott Andes; Armstrong Teasdale LLP

(57) ABSTRACT

In one aspect, the present invention is a web-based system that facilitates rapid and reliable documenting, cataloging, and distributing of proven error proofing techniques. More specifically, and in an exemplary embodiment, a system includes a plurality of clients coupled to a web-based server. Each client includes a plurality of user interface classes and at least one class that provides access to a database. The server includes a plurality of servlets, and at least some of said servlets provide at least one of a database and server access capability to each client. The system further includes a database having a plurality of tables, and at least one of said tables includes at least one error proofing example. The database is accessed by each client via the server.

20 Claims, 2 Drawing Sheets

METHOD AND APPARATUS FOR ERROR PROOFING

BACKGROUND OF THE INVENTION

This invention relates generally to product design, production and service and, more particularly, to error proofing processes associated with product design, production and service.

Error proofing methodologies have been documented by manufacturers and academic institutions. Such methodologies are used, for example, in product design to ensure that a final product meets a pre-defined specification, as well as in assembly processes. However, there is no known system for easily documenting, cataloging, and distributing proven error proofing techniques in a rapid and reliable manner.

An electronic mail based repository of text descriptions of candidate error proofing techniques is known. The error proofing techniques identified in the repository, however, are not necessarily proven, nor is the repository configured for rapid and reliable cataloging and distribution of information related to such techniques.

BRIEF SUMMARY OF THE INVENTION

In one aspect, the present invention is a web-based system that facilitates rapid and reliable documenting, cataloging, and distributing of proven error proofing techniques. More specifically, and in an exemplary embodiment, a system includes a web site that contains categorized error proofing techniques applicable to a broad range of design, manufacturing, assembly, product test, product service, and other processes. A graphical user interface also is provided so that error proofing techniques can be easily and reliable submitted to the web site for cataloging and distribution.

In one specific embodiment, the system includes a plurality of clients coupled to a web-based server. Each client includes a plurality of user interface classes and at least one class that provides access to a database. The server includes a plurality of servlets, and at least some of the servlets provide at least one of a database and server access capability to each client. The system further includes a database having a plurality of tables, and at least one of the tables includes at least one error proofing example. The database is accessed by each client via the server.

The above described web-based system enables many different users (e.g., design, manufacture, assembly, test, service, administrative users) to quickly access proven error proofing techniques from many locations. The users also can quickly and easily document and submit additional error proofing techniques for access by other users.

DETAILED DESCRIPTION OF THE INVENTION

Figure 1:
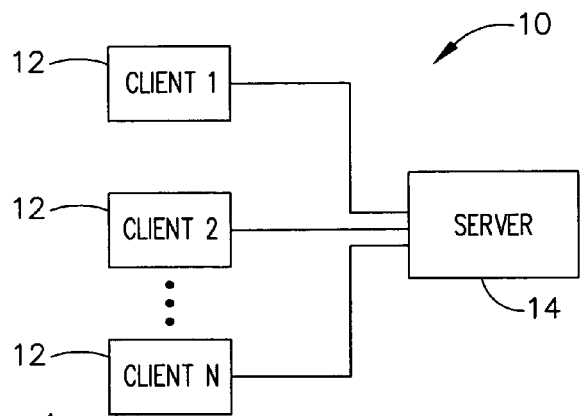
FIG. 1 is a block diagram of a client—server architecture.

FIG. 1 is a block diagram of a client—server architecture 10. Specifically multiple client processors 12, identified as Client 1, Client 2, Client N, are coupled to a server 14. Clients 1-N 12 include a user interface to enable users to extract as well as to input data into server 14. Server 14 provides access to an error proofing database which may be stored within server 14, or external and coupled to server 14. In one specific embodiment, server 14 is a web-based server that enables multiple clients 12 to access server 14 via the Internet.

Figure 2:
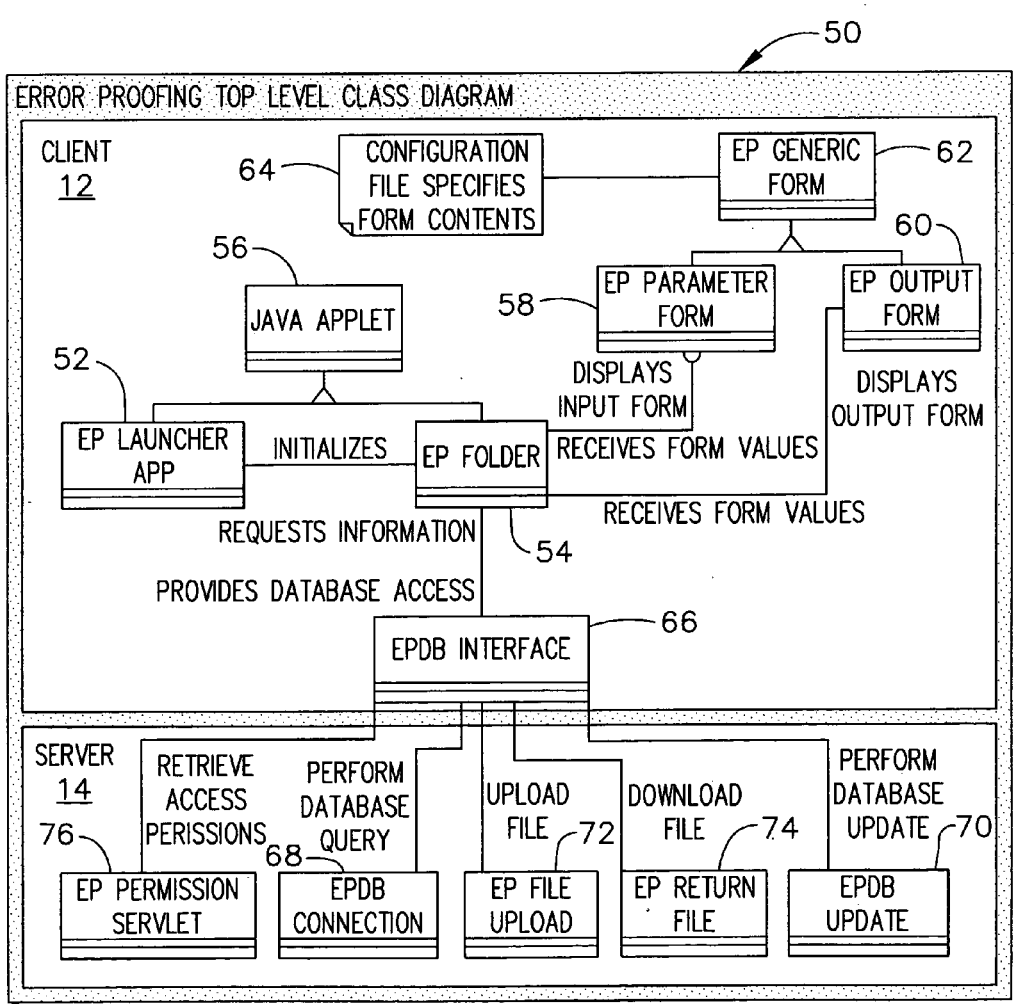
FIG. 2 is a class diagram for error-proofing processing.

FIG. 2 is a class diagram 50 for error-proofing processing, and illustrates the class processing performed by each client 12 and server 14. Each client 12 includes several user interface classes, and at least one class that provides access to the database via server 14. The user interface classes include two main visual components, EPLauncherApp 52 and EPFolder 54 both of which are Java Applets 56. Applets 56 control the information shown to the user, and handle all user input. EPLauncherApp 52 constructs and displays a menu of web pages that a user can view, including the web page that invokes the EPFolder Applet 54. The user can select any of the web pages in the menu to view. EPFolder 54 initializes and displays the forms that provide access to the error proofing capabilities, including creating new error proofing examples, performing queries, and downloading documents.

EPParameterForm 58 and EPOutputForm 60 are in EPGenericForm 62 and enable rapid assembly forms for input and output. EPParameterForm 58 and EPOutputForm 60 are both driven by configuration files 64 which specify the user interface components, such as text fields and drop-down menus. This capability provides considerable flexibility for evolving the user interface, since changes can be made quickly, and in some cases, without the need for recompiling. EPParameterForm 58, in one embodiment, assembles forms with any of the following user interface components: single line text fields, multiple line text areas, drop-down lists that allow selection of a single item, drop-down lists that allow selection of multiple items, drop down hierarchical lists that allow selection of a single item, groups of checkboxes arranged vertically or horizontally that allow selection of multiple items. Using EPParameterForm 58, forms can be built without needing to compile. EPParameterForm 58 can be extended to incorporate additional components as well.

An EPDBInterface class 66 provides access to information in the error proofing database via the server-side classes. All client-side knowledge of the database structure and access methods is contained within EPDBInterface 66. EPDBInterface also includes capabilities to format SQL statements and invoke requests to the servlets that provide database access.

The error proofing server side capabilities are provided by several servlets that run on error proofing web server 14. Each servlet provides a specific database and/or server access capability to client 12. EPDBConnection and EPDBUpdate servlets 68 and 70 provide basic database query and update capabilities. EPFileUpload servlet 72 provides the capability to upload a document to the server and update the error proofing database with the data from the user input form that describes that document. The EPReturnFile servlet 74 provides the capability to download a document from server 14. EPPermissionServlet servlet 76 extracts user permissions from the database.

Figure 3:
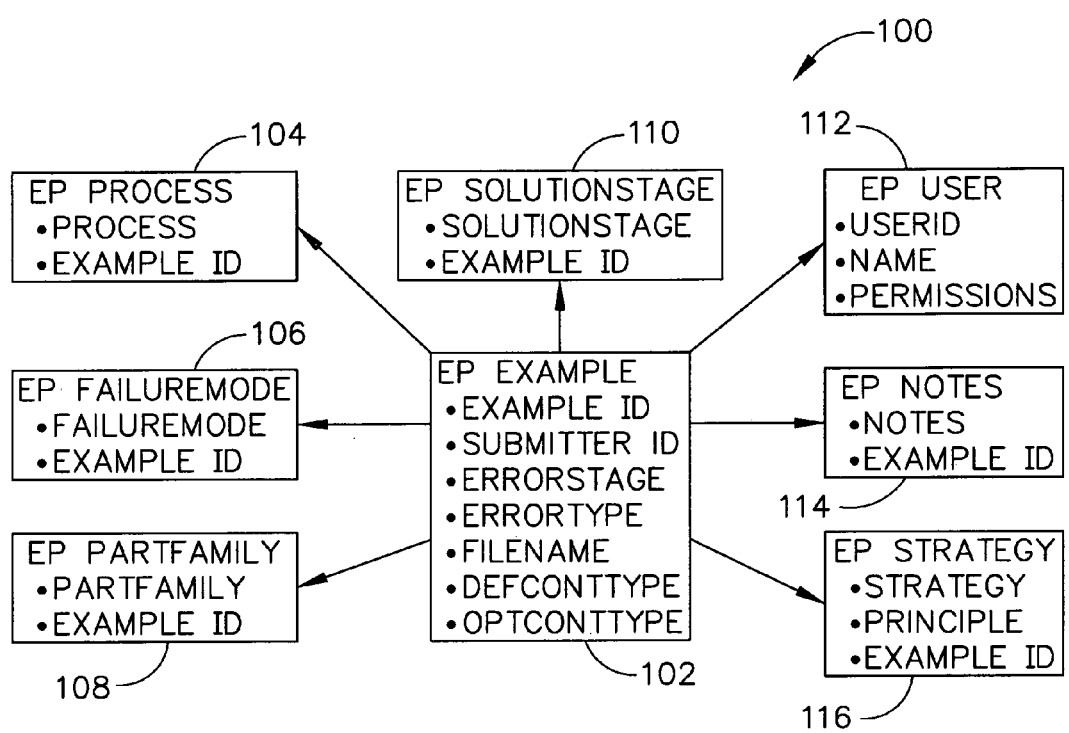
FIG. 3 is a block diagram of a database architecture.

FIG. 3 is a block diagram of a database architecture 100. Error proofing database 100 is implemented, in one embodiment, using an Oracle Relational Database Management System, which is well known. Database 100 includes a primary table 102, referred to as EPExample, and several related tables that store meta-data describing an error proofing example.

One entry is created in EPExample database table 102 for every error proofing example created by a user. EPExample table 102 contains meta-data that must be defined by the user in the creation of the error proofing example. These meta-data include the error stage and error type of the example. Additionally, there are several fields that are populated, including the Example ID, Submitter ID, Filename DefContType and OptContType. The Example ID field uniquely identifies one error proofing example, and is used as a key in identifying that example throughout database 100. The Submitter ID field is the user ID of the user who submitted the example. Filename, DefContType and OptContType contain data used by server 14 to store the actual document for the example.

EPPProcess table 104 stores the processes to which the error proofing example applies. The user provides the data for this field when creating the error proofing example. There can be zero, one or more processes associated with an error proofing example. Each entry to table 104 identifies the error proofing example with which it is associated through the example ID field.

EPFailureMode table 106 stores the failure modes associated with an error proofing example. The user provides the data for this field when creating the error proofing example. There can be zero, one or more failure modes associated with an error proofing example. In one specific embodiment, the user interface permits entry of one failure mode. Each entry to table 106 identifies the error proofing example with which it is associated through the example ID field.

EPPartFamily table 108 stores the part families to which the error proofing example applies. The user provides the data for this field when creating the error proofing example. There can be zero, one or more part families associated with an error proofing example. Each entry to table 108 identifies the error proofing example with which it is associated through the example ID field.

EPSolutionStage table 110 stores the solution stage to which the solution of the error proofing example applies. The user provides the data for this field when creating the error proofing example. There can be zero, one or more solution stages associated with an error proofing example. Each entry to table 110 identifies the error proofing example with which it is associated through the example ID field.

EPUser table 112 stores data identifying users of the error proofing web site. Users are identified by a unique ID, in the user ID field. The table also stores the name of the user and the permissions that are assigned to that user. Data for these files are provided by administration users when they create new users of the system.

EPNotes table 114 stores the textual data related to the error proofing example. The notes field is populated by software, and is used to store additional text that may be informational to the user. Each entry to table 114 identifies the error proofing example with which it is associated through the example ID field.

EPStrategy table 116 stores the principle and related strategy that are associated with an error proofing example. Both these fields are optional so that an entry may contain a principle or a strategy or both. The user provides the data for these fields when creating the error proofing example. There can be zero, one or more EPStrategy entries associated with an error proofing example. In one specific embodiment, one principle and multiple strategies can be entered for an error proofing example. Each entry to table 116 identifies the error proofing example to which it is associated through the example ID field.

An "administration" use case starts when a prospective user requests permission to access the ErrorProofing website. An existing user, with admin permission, must add the prospective user to the access list maintained by the httpd server, and to the ErrorProofing user database. A prospective user cannot access the ErrorProofing website until they are added to the user database. Only existing users with administrative privileges, e.g. an administrator, as assigned in the user database, can create a new user database entry. The administrator will also assign privileges to the new user. Privileges can be of the following types (additional types may be defined in the future):

insert User can create new EPexamples, including uploading documents read User can query existing EPexamples download User can download EPexample documents from the server admin User can create other new users and assign privileges The administrator accesses an administration form in the ErrorProofing website, and enters the prospective user's information, including userID, user name, and privileges. The administrator can choose to grant any combination of read, download, insert and admin privileges. It is the responsibility of the administrator to control and define the set of users that have privileges allowing modification of the database, such as admin privileges and insert privileges. The administrator then adds the new user to the users database.

This use case ends when the administrator has added the user to an httpd server access list and the users database, and has granted privileges that the administrator deems required. If an error message "user ID already exists in the database" is displayed, then the addition to the database will not be performed, and a popup window, identifying that the userID is a duplicate, will be displayed to the administrator.

A "user login" case starts when a person invokes the ErrorProofing client on a browser by entering the URL of the ErrorProofing website in his/her browser. A login prompt will be displayed to the person. Person types in userID and password and presses enter. The httpd server will validate this userID and password against an httpd access list. Before displaying the ErrorProofing user interface, the ErrorProofing client will retrieve the permissions for that userID from the user database, and store those permissions for controlling access throughout the session.

This use case ends when person is validated as an ErrorProofing user. If an error message "user id is not found in the httpd access list" is displayed, then the person will be denied access to the ErrorProofing website. If an error message "user id cannot be located in user database" is displayed, then the person will be denied access to the ErrorProofing website and a message will be generated to the administrator that this event occurred.

An "initialization" use case starts when a user invokes the ErrorProofing client on users' browser, and is successfully validated as an ErrorProofing user. A list of web pages to view is displayed as is the chosen web page. Initially, the chosen web page defaults to the ErrorProofing page, which is displayed in the web page display area. Other pages in the list are help, comments, and best practices.

The content of the ErrorProofing page is determined by the user's privileges. If the user has no privileges, then no ErrorProofing forms will be displayed. If the user has insert privileges, then an insert form will be displayed. If the user has read privileges, then the query form will be displayed, as well as an output form. If the user has download privileges, then the output form will enable download of a selected document. If the user has admin privileges, an admin form will be displayed. The query form is always the first form displayed if the user has read privileges.

This use case ends when the ErrorProofing page and the list of available web pages are displayed to the user.

A "user selection of page to view" use case starts when user selects a web page from the list of forms in the left-hand frame. The selected web page is loaded into the browser. If the selected web page is the ErrorProofing page, then an EPFolder applet is initialized and displayed. Note that since the EPFolder applet is initialized when the ErrorProofing page is displayed, any previous EPFolder applet will be replaced. If there is work in progress in a previous EPFolder applet, it will be inaccessible.

This use case ends when the selected web page is displayed to the user.

An "inserting a new error proofing example" use case starts when a user with insert permissions initiates an input screen to create a new ErrorProofing example. User indicates properties (e.g. error type, error stage, solution stage (s), failure mode, process(es), strategy(ies), principle, part family(ies) that describe a new ErrorProofing example on the input screen, and enters the new ErrorProofing example. User is presented with a file upload form in a separate browser window. The file upload form includes a browse capability for finding files on the local computer, and a text input area for entering a description of the document. User specifies a document to be uploaded to the server as part of this ErrorProofing example, optionally including a description of the document. User presses submit to upload the document, and is presented with a new file upload form for uploading another document. User can enter another document to be uploaded, or can indicate that there are no more documents to upload. The uploaded document(s) are saved to the server platform, and SQL statements are generated from the information on the input form to insert the new example data into the database. A new EP Example row is created with a unique example ID value, and the error Stage, error type and submitter ID from the form. For each solution stage indicated on the form a row is created in the Solution Stage table, using the same Example ID created for the EP Example row. Similarly, a new row is created for each failure mode, process, and part family indicated on the form. For each strategy indicated on the form, a row containing the example ID, strategy and principle (from the form) is created in the strategy table.

This use case ends when the database updates and file uploads are complete. The user is notified of the completion status of the upload.

A "searching the ErrorProofing database" use case starts when a user with read permissions selects the query screen to create a query. User indicates search constraints (e.g. error type(s), error stage(s), process(es), solution stage(s), strategy(ies), part family(ies), failure mode, submitter) on the query form, and initiates a search for matching ErrorProofing examples. Alternatively, a freeform search engine will search the entire database including embedded text within documents and return all the locations of all such occurrences.

ErrorProofing examples that are an exact match (meet all of the search constraints) are returned and displayed to the user in a table on the output form. User can select ErrorProofing examples displayed in the output table to view the notes describing the example. The notes are a list of the input values that were submitted with that example when it was created. This use case ends when the output table is populated with the results of the query.

A "downloading ErrorProofing documents" use case starts when a user with download permissions executes a query, and the results are displayed on the output form. The user initiates download of the document for an example that is in the output table. The document is displayed in a separate browser window. The user can download the documents for any number of examples in the output table. This use case ends when the document is displayed to user.

While the invention has been described in terms of various specific embodiments, those skilled in the art will recognize that the invention can be practiced with modification within the spirit and scope of the claims.

What is claimed is:

1. A computer system comprising:
   a plurality of clients, each said client comprising a plurality of user interface classes and at least one class that provides access to a database;
   a server comprising a plurality of servlets, at least some of said servlets providing at least one of a database and server access capability to each said client; and
   said database comprising a plurality of tables, at least one of said tables comprising at least one error proofing example entered by a user and meta-data entered by the user that describes the at least one error proofing example, wherein said meta-data comprises at least one of an error stage and an error type, at least one of said tables further comprising at least one failure mode associated with the error proofing example, the error proofing example including at least one failure mode and meta-data defined by the user when creating the at least one error proofing example wherein said database accessed by each said client via said server, wherein at least one of said plurality of user interface classes initializes and displays at least one form that provides the user access to input additional error proofing examples based on user privileges defined by an administrator.

2. A system in accordance with claim 1 wherein each said user interface classes comprise at least two visual components for controlling information shown to a user and for handling user input.

3. A system in accordance with claim 2 wherein one of said user interface classes constructs and displays a menu of web pages that a user can view.

4. A system in accordance with claim 2 wherein at least one of said user interface classes initializes and displays another of the at least one forms.

5. A system in accordance with claim 1 wherein said at least one class formats SQL statements and invokes requests to servlets in said server that provide database access.

6. A system in accordance with claim 1 wherein said server comprises servlets for database queries and updating, uploading a document and updating said database, downloading a document, and extracting user permissions from said database.

7. A system in accordance with claim 1 wherein one of said tables stores processes to which an error proofing example applies and failure modes associated with an error proofing example.

8. A system in accordance with claim 1 wherein one of said tables stores families of parts to which an error proofing example applies.

9. A system in accordance with claim 1 wherein one of said tables stores a solution stage to which a solution of an error proofing example applies.

10. A system in accordance with claim 1 wherein one of said tables stores data identifying users of the error proofing website.

11. A system in accordance with claim 1 wherein one of said tables stores textual data relating to the error proofing example.

12. A system in accordance with claim 1 wherein one of said tables stores a principle and related strategy that are associated with an error proofing example.

13. A method for identifying an error proofing technique for a given application using a web-based computer system, the computer system including a plurality of clients including a plurality of user interface classes, a server including a plurality of servlets, and a database including a plurality of tables including at least one error proofing example entered by a user and user defined meta-data entered by the user to describe the at least one error proofing example, said method comprising the steps of:

using at least one interface class to provide access to a database, wherein the at least one user interface class initializes and displays at least one form that provides the user access to input additional error proofing examples based on user privileges defined by an administrator;

using at least some of the servlets to provide at least one of database and server access capability to a client;

entering at least one error proofing example by a user and meta-data entered by the user to describe the error-proofing example, wherein the meta-data includes at least one of an error stage and an error type;

accessing a table containing at least one of the error proofing examples;

storing failure modes in the table associated with the at least one error proofing example; and choosing the error proofing technique to fit the given application.

14. A method in accordance with claim 13 wherein said step of using at least one interface class to provide access to a database further comprises the step of providing at least two visual components for controlling information shown to a user and for handling user input.

15. A method in accordance with claim 14 wherein said step of providing at least two visual components for controlling information shown to a user and for handling user input further comprises the step of constructing and displaying a menu of web pages that a user can view.

16. A method in accordance with claim 14 wherein said step of providing at least two visual components for controlling information shown to a user and for handling user input further comprises the step of initializing and displaying another of the at least one forms.

17. A method in accordance with claim 13 wherein said step of using at least some of the servlets to provide at least one of database and server access capability to a client further comprises the steps of:

formatting at least one SQL statement via at least one servlet providing access to database; and invoking requests to servlets in the server that provides database access.

18. A method in accordance with claim 13 wherein said step of using at least some of the servlets to provide at least one of database and server access capability to a client further comprises the steps of:

querying the database;

uploading a document and updating the database; and downloading a document and extracting user permissions from the database.

19. A method in accordance with claim 13 wherein said step of accessing a table containing the at least one error proofing example further comprises the steps of:

storing processes in the table to which the at least one error proofing example applies.

20. A method in accordance with claim 13 wherein said step of accessing a table containing at least one error proofing example further comprises the steps of:

storing part families in the table to which the at least one error proofing example applies;

storing a solution stage in the table to which a solution of the at least one error proofing example applies;

storing data identifying users of the error proofing website in the table;

storing textual data relating to the at least one error proofing example in the table; and storing a principle and related strategy that are associated with the at least one error proofing example in the table.

* * * * *